(12) United States Patent
Choi et al.

(10) Patent No.: US 8,566,523 B2
(45) Date of Patent: Oct. 22, 2013

(54) MULTI-PROCESSOR AND APPARATUS AND METHOD FOR MANAGING CACHE COHERENCE OF THE SAME

(75) Inventors: Ju-Hee Choi, Seoul (KR); HyeOn Jang, Seongnam-si (KR); Jungyul Pyo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 301 days.

(21) Appl. No.: 12/858,571

(22) Filed: Aug. 18, 2010

(65) Prior Publication Data

US 2011/0119450 A1    May 19, 2011

(30) Foreign Application Priority Data

Nov. 19, 2009 (KR) .......................... 10-2009-112096

(51) Int. Cl.
*G06F 13/00* (2006.01)
(52) U.S. Cl.
USPC .................... 711/124; 711/130; 711/E12.026
(58) Field of Classification Search
USPC ................................... 711/124, 130, E12.026
See application file for complete search history.

(56) References Cited

U.S. PATENT DOCUMENTS

| | | | |
|---|---|---|---|
| 5,713,004 A * | 1/1998 | Kimmel et al. ................ | 711/145 |
| 5,727,150 A | 3/1998 | Laudon et al. | |
| 5,734,922 A * | 3/1998 | Hagersten et al. ............... | 712/37 |
| 6,704,842 B1 * | 3/2004 | Janakiraman et al. ......... | 711/141 |
| 8,103,834 B2 * | 1/2012 | Cypher et al. ................. | 711/141 |
| 8,135,916 B1 * | 3/2012 | O'Bleness et al. ............. | 711/141 |
| 2002/0040382 A1 * | 4/2002 | Ueda ............................. | 709/106 |
| 2006/0174228 A1 * | 8/2006 | Radhakrishnan et al. .... | 717/127 |

OTHER PUBLICATIONS

Stenström, et al., "An Adaptive Cache Coherence Protocol Optimized for Migratory Sharing", (pp. 109-118) Lund University, Dept of Computer Engineering, 1993.

* cited by examiner

*Primary Examiner* — Edward Dudek, Jr.
(74) *Attorney, Agent, or Firm* — Harness, Dickey & Pierce, P.L.C.

(57) ABSTRACT

A cache consistency management device according to example embodiments comprises a ping-pong monitoring unit monitoring a ping-pong migration sequence generated between a plurality of processors; a counting unit counting the number of successive generations of the ping-pong migration sequence in response to the monitoring result; and a request modifying unit modifying a migration request to a request of a non-migratory sharing method on the basis of the counting result.

21 Claims, 8 Drawing Sheets

MULTI-PROCESSOR AND APPARATUS AND METHOD FOR MANAGING CACHE COHERENCE OF THE SAME

CROSS-REFERENCE TO RELATED APPLICATIONS

This U.S. non-provisional patent application claims priority under 35 U.S.C. §119 to Korean Patent Application No. 10-2009-0112096, filed on Nov. 19, 2009, in the Korean Intellectual Property Office (KIPO) the entire contents of which are incorporated herein by reference.

BACKGROUND

1. Field

The present disclosure herein relates to a computing system, and more particularly, to an apparatus and a method of managing cache coherence for a multi-processor including a plurality of cores.

2. Background

A multi-processor is one of systems often used in processing parallel programs. A cache memory to reduce a difference of a processing speed between a processor having a high speed and a main memory having a low speed is used in each of a plurality of processors included in a multi-processor.

When each processor has its own local cache and shares a memory with other processors, a data inconsistency problem may occur due to cache renewal. For example, assume that two clients have share variable X relative to a variable X and a value of the variable X is 0. At this time, if a first processor substitutes the variable X for 1 and a second processor reads the variable X, the second processor does not read the variable X having the value 1 modified by the first processor but reads the variable X having the value 0 which is now present at its local cache. Therefore, since a first cache included in the first processor and a second cache included in the second processor have different values from each other relative to the same variable X, a data inconsistency problem occurs between the first and second processors. A data coherence protocol may be applied to solve the data inconsistency problem.

In particular, in a multi-processor system using a shared memory, data coherence has to be essentially maintained. To improve an operation performance of each processor included in a multi-processor system, a method of effectively maintaining data consistency between cache memories while reducing an unnecessary waiting time of a processor and bus traffic is required.

SUMMARY

Example embodiments provide a cache consistency management device. The cache consistency management device may include a ping-pong monitoring unit monitoring a ping-pong migration sequence generated between a plurality of processors; a counting unit counting the number of successive generations of the ping-pong migration sequence in response to the monitoring result; and a request modifying unit modifying a migration request to a request of a non-migratory sharing method on the basis of the counting result.

Example embodiments also provide a multi-processor. The multi-processor may include a plurality of processors each of which comprises at least one cache; and a cache consistency management device counting the number of successive generations of a ping-pong migration sequence generated between the plurality of processors and modifying a coherence management mode with respect to the plurality of processors on the basis of the counting result.

Example embodiments also provide a cache consistency management method. The cache consistency management method may include counting the number of successive generations of a ping-pong migration sequence generated between a plurality of processors; and modifying a migration request to a request of a non-migratory sharing method on the basis of the counting result and providing the modified request to a corresponding processor.

Example embodiments also provide a cache consistency management device. The cache consistency management device may include a ping-pong monitoring unit monitoring a ping-pong migration sequence generated between a plurality of processors; a counting unit counting the number of successive generations of the ping-pong migration sequence in response to the monitoring result; and a request modifying unit modifying a coherence management mode based on the counting result.

Example embodiments also provide a cache consistency management method. The cache consistency management method may include counting the number of successive generations of a ping-pong migration sequence generated between a plurality of processors; and modifying a coherence management mode based on the counting result and providing the modified request to a corresponding processor.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
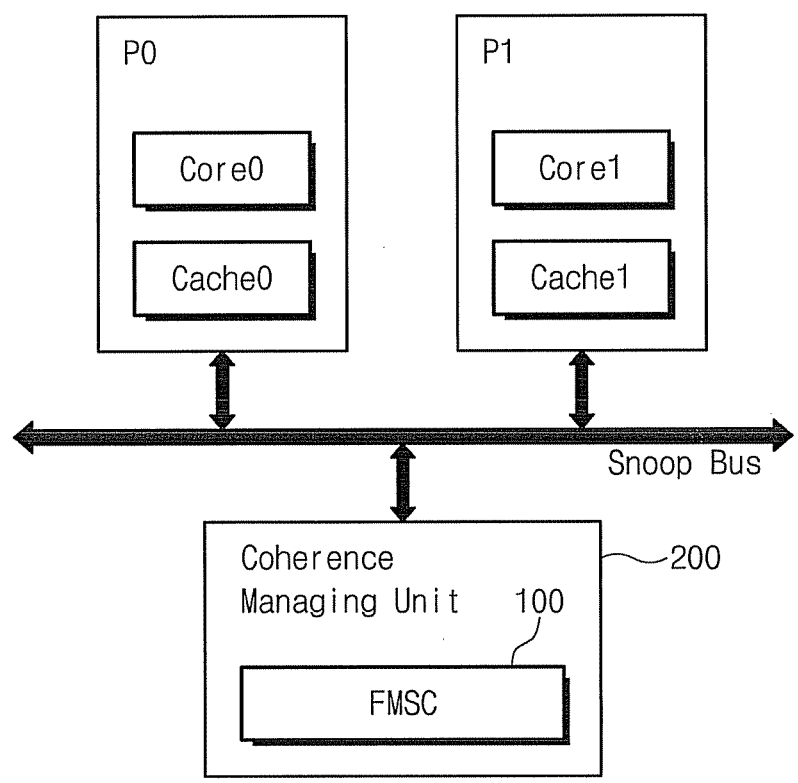
FIG. 1 is a block diagram illustrating a construction of a multi-processor system according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

A cache consistency management device according to example embodiments monitors a ping-pong phenomenon which is occurring between processors and can change a cache consistency management mode being applied to a multi-processor on the basis of a monitored result. According to that construction, an unnecessary transaction does not occur when a cache consistency management operation is performed. As a result, a waiting time of a processor and bus traffic can be reduced and an operation performance of a multi-processor is effectively improved.

FIG. 1 is a block diagram illustrating a construction of a multi-processor system in accordance with example embodiments.

Referring to FIG. 1, a multi-processor system may include a plurality of processors (P0, P1). Each of the processors (P0, P1) may form nodes in the multi-processor system. Though FIG. 1 illustrates two processors (P0, P1), according to example embodiments the multi-processor system may include any number of processors (i.e., number of nodes), for example 3, 4 or 5.

Each processor (Pi, the i is a positive integer) may include a core i (the i is a positive integer) functioning as a central processing unit (CPU) and at least one cache memory (cache i, the i is a positive integer). The cache memory (cache i) may be configured to have a cache hierarchical structure in each processor (Pi). For example, a cache memory (cache i) included in each processor (Pi) may have a plurality of caches such as a first level cache (L1 cache), a second level cache (L2 cache) or a third level cache (L3 cache) which is hierarchically structured. A management method of data coherence which will be described below is not limited to a cache memory of a specific hierarchy and may be applied to a data coherence management of a cache memory of various shapes and various hierarchies.

A plurality of processors (P0, P1) may be connected to a coherence managing unit 200 through a snoop bus. The coherence management unit 200 may perform data coherence management on a plurality of cache memories (cache 0, cache 1) included in the plurality of processors (P0, P1). The coherence management unit 200 may be commonly connected to the plurality of processors (P0, P1) through the snoop bus or may be included in each of the processors (P0, P1). The coherence management unit 200 may be connected to a main memory and an I/O device through a shared bus (not illustrated). A composition form of the coherence management unit 200 is not limited to a specific form but may be variously changed and deformed.

A method of reading or writing a shared cache memory in only one core (core 0 or core 1) may be applied to a multi-processor such as symmetric multi-processor (SMP). The method is called a migratory objection method or a migration method. When the migratory objection method or the migration method is applied, a migration request may be asked between the coherence management unit 200 and cores (core 0, core 1). If a migration request is asked, when transmitting data from one core, for example core 0, to the other core, for example core 1, an operation invalidating a cache line of a core having original data, for example core 0, may be performed.

A migratory sharing method is a method suggested to reduce a write invalidate request which often occurs in a protocol in accordance with a MSI (modified shared invalid) based coherence policy. When a migratory sharing method is applied, in a case of successively performing an access (e.g., a read operation) not to a migratory sharing but to data, a cache miss and a transaction (e.g., a migratory transaction) may often occur to deteriorate performance of the system. Phenomenon that unnecessary transactions alternately occur between a plurality of processors is called ping-pong phenomenon.

To prevent the aforementioned problem, a FMSC (false migratory sharing controller) 100 may be included in the coherence management unit 200. The FMSC 100 can perform a coherence management operation so that a migration method (i.e., a migratory sharing method) is selectively applied to multi-processors when a cache coherence management operation is performed. In an illustrative embodiment, the FMSC 100 according to example embodiments monitors ping-pong phenomenon occurring between processors and can change a migration request into a request of a non-migratory sharing method on the basis of a monitored result. According to that construction, when a cache coherence management operation is performed, an unnecessary transaction does not occur between processors. As a result, a waiting time of a processor and bus traffic can be reduced and operation performance of a multi-processor is effectively improved.

Figure 2:
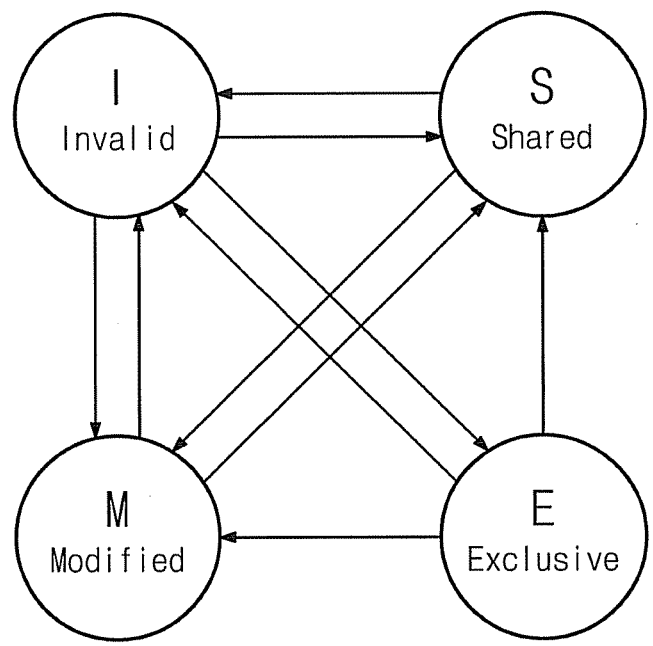
FIG. 2 is a drawing illustrating a state transition of MESI protocol which is one example of consistency management protocol.

FIG. 2 is a drawing illustrating a state transition of MESI (modified exclusive shared invalid) protocol which is one of consistency management protocols by example.

Referring to FIG. 2, the MESI protocol may have four cache states. For example, a modified state (M), an exclusive state (E), a shared state (S) and an invalid state (I).

The modified state (M) may mean that data stored in a cache memory is modified due to a write operation performed in a corresponding cache. The exclusive state (E) may mean that data in only a corresponding cache is valid and data in another cache is not valid. The shared state (S) may mean that data is stored in two or more caches. If a cache line is in the shared state (S), data of a corresponding cache and data of another cache sharing the data are all valid. The invalid state (I) may mean that data of a corresponding cache is not valid. For example, in a case that data is modified in one cache of two caches in the shared state (S), data in the other cache enters the invalid state (I) and thereby a corresponding data may become invalid.

The MESI protocol is based on a MSI protocol. There are MESI, MOSI (modified owned shared invalid), MOSEI (modified owned shared exclusive invalid) or the like in a coherence management protocol based on MSI protocol. According to example embodiments, a coherence management protocol wherein a migratory sharing method is added to the MESI protocol may be applied and the migratory sharing method may be selectively applied according to the number of transactions occurring between processors. In an illustrative embodiment, a migratory sharing method can be applied to different kinds of protocols besides a MESI protocol.

Figure 3:
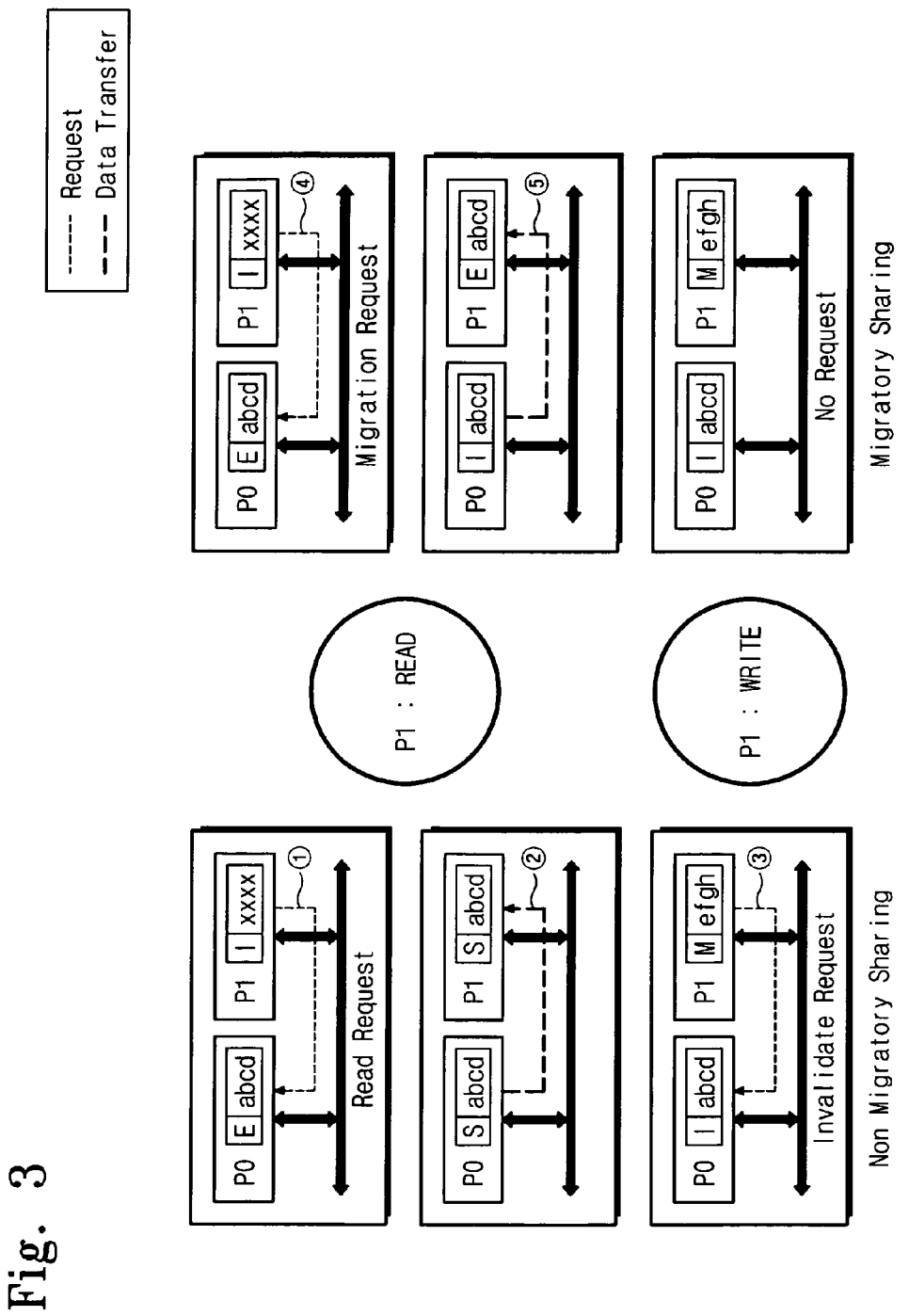
FIG. 3 is a drawing illustrating a state transition when a non-migratory sharing method is applied to a consistency management of a multi-processor system and a state transition when a migratory sharing method is applied to a consistency management of a multi-processor system.

FIG. 3 is a drawing illustrating a state transition when a non-migratory sharing method is applied to a consistency management of a multi-processor system and a state transition when a migratory sharing method is applied to a consistency management of a multi-processor system. In FIG. 3, a case that a migratory sharing method is applied to a MESI protocol and a case that a migratory sharing method is not applied to a MESI protocol (i.e., non-migratory sharing method) are illustrated by example.

First, in a case where a non-migratory sharing method is applied to a consistency management (for example, a MESI protocol wherein a migratory sharing method is not applied), a cache of a first processor (P0) in which data 'abcd' is stored is in the exclusive state (E). A cache of a second processor (P1) in which valid data is not stored is in the invalid state (I). When the second processor (P1) reads data from a cache of the first processor (P0), the second processor (P1) asks for a request to the first processor (P0) (referring to an arrow ①). And then, the second processor (P1) reads data 'abcd' from a cache of the first processor (P0) (referring to an arrow ②). A read request operation performed between the first and second processors (P0, P1) may be performed through a snoop bus. The coherence management unit 200 senses a read request asked through a snoop bus and changes a cache of the second processor (P1) in which a read operation is performed from the invalid state (I) to the sharing state (S). The coherence management unit 200 changes a cache of the first processor (P0) from the exclusive state (E) to the sharing state (S).

In a case of modifying data stored in a cache of the second processor (P1) from 'abcd' to 'efgh' under a state that caches of the first and second processors (P0, P1) are shared with each other, the second processor (P1) first transmits an invalidate request to the first processor (P0) through a snoop bus (referring to an arrow ③). The coherence management unit 200 detects the invalidate request asked through the snoop bus and changes a cache of the first processor (P0) from the shared state (S) into the invalid state (I) on the basis of a detection result. After a cache of the first processor (P0) is changed into the invalid state (I), a cache of the second processor (P1) modifies data stored in a cache of the second processor (P1) from 'abcd' to 'efgh'. After that, a state of a cache of the second processor (P1) is changed from the shared state (S) to the modified state (M) by a control of the coherence management unit 200. In a case of remodifying data stored in a cache of the second processor (P1) to a different value under that state, a cache of the second processor (P1) modifies only a data value while maintaining the modified state (M).

In a case of a migratory sharing method, a cache of the first processor (P0) in which data 'abcd' is stored will be in the exclusive state (E). A cache of the second processor (P1) in which a valid data is not stored will be in the invalid state (I). In a case that the second processor (P1) reads data from a cache of the first processor (P1), the second processor (P1) asks for a migration request to the first processor (P0) (referring to an arrow ④). And then, the second processor (P1) reads data 'abcd' from a cache of the first processor (P0) (referring to an arrow ⑤). A read request operation performed between the first and second processors (P0, P1) can be performed through a snoop bus. The coherence management unit 200 detects a migration request asked through a snoop bus and changes a cache of the first processor (P0) of which data was read from the exclusive state (E) into the invalid state (I) on the basis of a detection result. And then, the coherence management unit 200 changes a cache of the second processor (P1) which read data from the invalid state (I) into the exclusive state (E).

Under that state, in a case of modifying data stored in a cache of the second processor (P1) from 'abcd' to 'efgh', the second processor (P1) does not generate any request and directly modifies data from 'abcd' to 'efgh'. In this case, a state of a cache of the second processor (P1) is changed from the exclusive state (E) into the modified state (M) by a control of the coherence management unit 200. In a case of remodifying data stored in a cache of the second processor (P1) to a different value under that state, a cache of the second processor (P1) modifies only a data value while maintaining the modified state (M).

As illustrated in FIG. 3, in a case that a migratory sharing method is applied, an invalidate request (i.e., a write invalidate request) generated in a write operation relative to a cache is not needed. A reduction of the write invalidate request brings an effect of reducing an unnecessary waiting time of a processor and bus traffic. However, in a case that a migratory sharing method is applied to a coherence management, when an access not to a migratory sharing but to data is successively performed, a ping-pong phenomenon may occur due to an unnecessary transaction (for example, a migratory transaction).

Figure 4:
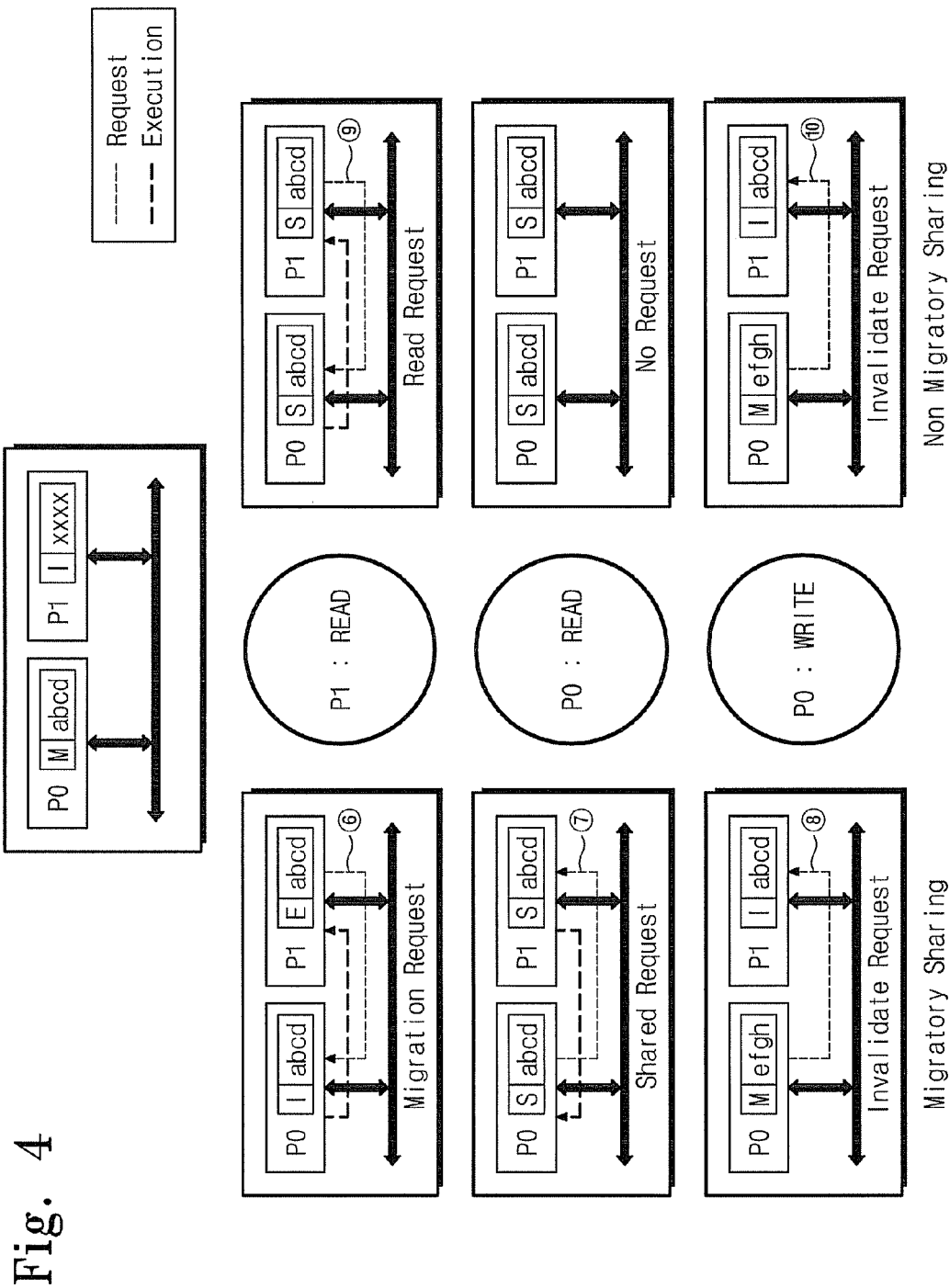
FIG. 4 is a drawing for describing a ping-pong phenomenon which may occur when a migratory sharing method is applied to a consistency management of a multi-processor system and when a non-migratory sharing method is applied to a consistency management of a multi-processor system.

FIG. 4 is a drawing for describing a ping-pong phenomenon which may occur when a migratory sharing method is applied to a consistency management of a multi-processor system and when a non-migratory sharing method is applied to a consistency management of a multi-processor system. In FIG. 4, a case that a migratory sharing method is applied to a MESI protocol and a case that a migratory sharing method is not applied to a MESI protocol (i.e., non-migratory sharing method) are illustrated by example.

Assume that data 'abcd' is stored in a cache of the first processor (P0) and invalid data 'xxxx' is stored in a cache of the second processor (P1) as an initial state. In this case, a cache of the first processor (P0) in which data 'abcd' is stored will be in the exclusive state (E). A cache of the second processor (P1) in which valid data is not stored will be in the invalid state (I).

First, a case that a migratory sharing method is applied will be described. In a case that the second processor (P1) reads data from a cache of the first processor (P0), the second processor (P1) asks for a migration request to the first processor (P0) (referring to an arrow ⑥). And then, the second processor (P1) reads data 'abcd' from a cache of the first processor (P0). A read request operation performed between the first and second processors (P0, P1) can be performed through a snoop bus. The coherence management unit 200 detects a migration request asked through a snoop bus and changes a cache of the first processor (P0) of which data was read from the exclusive state (E) into the invalid state (I) on the basis of a detection result. And then, the coherence management unit 200 changes a cache of the second processor (P1) which read data from the invalid state (I) into the exclusive state (E).

Under that state, in a case that the first processor (P0) reads data from a cache of the second processor (P1), the first processor (P0) asks for a shared request to the second processor (P1) (referring to an arrow ⑦). And then, the first processor (P0) reads data 'abcd' from a cache of the second processor (P1). A read request operation performed between the first and second processors (P0, P1) can be performed through a snoop bus. The coherence management unit 200 detects a migration request asked through a snoop bus and changes a cache of the second processor (P1) of which data was read from the exclusive state (E) into the shared state (S) on the basis of a detection result. And then, the coherence management unit 200 changes a cache of the second processor (P1) which read data from the invalid state (I) into the shared state (S).

In a case of modifying data stored in a cache of the first processor (P0) from 'abcd' to 'efgh' under a state that caches of the first and second processors (P0, P1) are shared with each other, the first processor (P0) first transmits an invalidate request to the second processor (P1) through a snoop bus (referring to an arrow ⑧). The coherence management unit 200 detects the invalidate request asked through the snoop bus and changes a cache of the second processor (P1) from the shared state (S) into the invalid state (I) on the basis of a detection result. After a cache of the second processor (P1) is changed into the invalid state (I), a cache of the first processor (P0) modifies data stored in a cache of the first processor (P0) from 'abcd' to 'efgh'. After that, a state of a cache of the first processor (P0) is changed from the shared state (S) to the modified state (M) by a control of the coherence management unit 200.

Continually, a case that a non-migratory sharing method is applied to a coherence management of a multi-processor system will be described.

In the same initial state, a cache of the first processor (P0) in which data 'abcd' is stored will be in the exclusive state (E). A cache of the second processor (P1) in which valid data is not stored will be in the invalid state (I). In this state, in a case that the second processor (P1) reads data from a cache of the first processor (P0), the second processor (P1) asks for a read request to the first processor (P0) (referring to an arrow ⑨). And then, the second processor (P1) reads data 'abcd' from a cache of the first processor (P0). A read request operation performed between the first and second processors (P0, P1) can be performed through a snoop bus. The coherence management unit 200 detects a migration request asked through a snoop bus and changes a cache of the second processor (P1) of which data was read from the invalid state (I) into the shared state (S) on the basis of a detection result. And then, the coherence management unit 200 changes a cache of the first processor (P0) of which data was read from the exclusive state (E) into the shared state (S).

In a case that the first processor (P0) reads data from a cache of the second processor (P1) in a state that caches of the first and second processors (P0, P1) are shared with each other, the first processor (P0) reads data 'abcd' from a cache of the second processor (P1) without a generation of any request. In this case, the first and second processors (P0, P1) maintain the shared state (S).

In a case of modifying data stored in a cache of the first processor (P0) from 'abcd' to 'efgh' in a state that caches of the first and second processors (P0, P1) are shared with each other, the first processor (P0) first transmits an invalidate request to the second processor (P1) through a snoop bus (referring to an arrow ⑩). The coherence management unit 200 detects the invalidate request asked through the snoop bus and changes a cache of the second processor (P1) from the shared state (S) into the invalid state (I) on the basis of a detection result. After a cache of the second processor (P1) is changed into the invalid state (I), a cache of the first processor (P0) modifies data stored in a cache of the first processor (P0) from 'abcd' to 'efgh'. After that, a state of a cache of the first processor (P0) is changed from the shared state (S) to the modified state (M) by a control of the coherence management unit 200.

As illustrated in FIG. 4, in a case that a migratory sharing method is applied to a coherence management, when an access not to a migratory sharing but to data (for example, referring to an arrow ⑥ of FIG. 4) is performed, a ping-pong phenomenon may occur due to unnecessary transactions. An unnecessary transaction which may be generated when a migratory sharing method is applied is called a FMT (false migratory transaction).

To prevent a problem that an unnecessary transaction is successively generated, a method of operation according to example embodiment does not fixedly apply one kind of a coherence management method or a protocol but has a construction selectively applying at least two coherence management methods (for example, things to which a migratory sharing method is applied and is not applied). When a cache coherence management operation is performed, the FMSC 100 according to example embodiments monitors a ping-pong phenomenon which is occurring between processors and may change a migratory request into a different request (for example, a shared request) on the basis of a monitored result. This may mean that a coherence management mode of the coherence management unit 200 is changed so that a migration method (i.e., a migratory sharing method) is selectively applied to a coherence management of cache memories.

Figure 5:
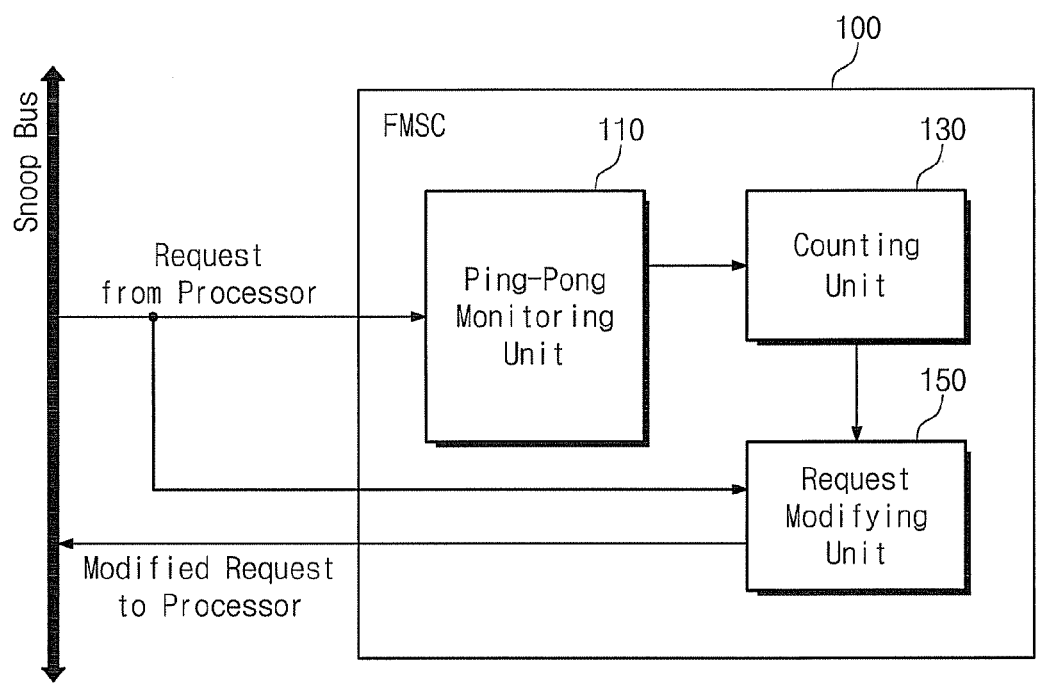
FIG. 5 is a block diagram illustrating a construction of FMSC (false migratory sharing controller) in accordance with example embodiments.

FIG. 5 is a block diagram illustrating a construction of FMSC (false migratory sharing controller) 100 according to example embodiments.

Referring to FIG. 5, the FMSC 100 may be comprised of a ping-pong monitoring unit 110, a counting unit 130 and a request modifying unit 150. The ping-pong monitoring unit 110 can monitor a ping-pong phenomenon due to a repetitive transaction which is generated in a plurality of cores, for example Core 0 and Core 1, included in a plurality of processors, for example P0 and P1. A ping-pong phenomenon can be monitored by detecting a generation of a ping-pong migration sequence. The ping-pong monitoring unit 110 can change a coherence management mode of the coherence management unit 200 according to a detection result of a ping-pong migration sequence. In an illustrative embodiment, according to a monitoring result performed in the ping-pong monitoring unit 110, a migration sharing method may be selectively applied to a coherence management mode applied to a multi-processor.

Also, the ping-pong monitoring unit 110 can control a counting operation of the counting unit 130 in response to a detection result of a ping-pong migration sequence. For example, the ping-pong monitoring unit 110, in a case that a ping-pong migration sequence is not successively generated, can initialize a counting operation of the counting unit 130. The counting unit 130 can count the number of generation of a ping-pong migration sequence in response to a count-up control signal generated from the ping-pong monitoring unit 110. A count result of the counting unit 130 may be provided to the request modifying unit 150. A counting value of the counting unit 130 may be initialized by a control of the ping-pong monitoring unit 110. The ping-pong monitoring unit 110 can generate a control signal (for example, a counting up control signal, a counting down control signal) increasing or decreasing a counting value of the counting unit 130 besides an operation initializing a counting value of the counting unit 130. According to that construction, a counting value of the counting unit 130 may be controlled according to the ping-pong monitoring unit 110.

The request modifying unit 150, in response to a request provided by a plurality of processors (P0, P1) and a counting result of the counting unit 130, can selectively replace or modify a migration request inputted at present to a different kind of request (for example, a shared request). A request selectively replaced or modified by the request modifying unit 150 may be provided to processors through a snoop bus. For example, the request modifying unit 150, in a case that a counting result of the counting unit 130 is greater than a desired (or alternatively, a predetermined) threshold value (TH), replaces or modifies a migration request inputted at present to a request of non-migratory sharing method, and then may provide the replaced or modified request to a processor corresponding to the request. The request modifying unit 150, in a case that a counting result of the counting unit 130 is smaller than a desired (or alternatively, a predetermined) threshold value (TH), may provide a migration request inputted at present as it is to a corresponding processor. That is, a request outputted from the request modifying unit 150 may be a request as it is provided from at least one of a plurality of processors or may be a request replaced or modified by the request modifying unit 150.

Figure 6:
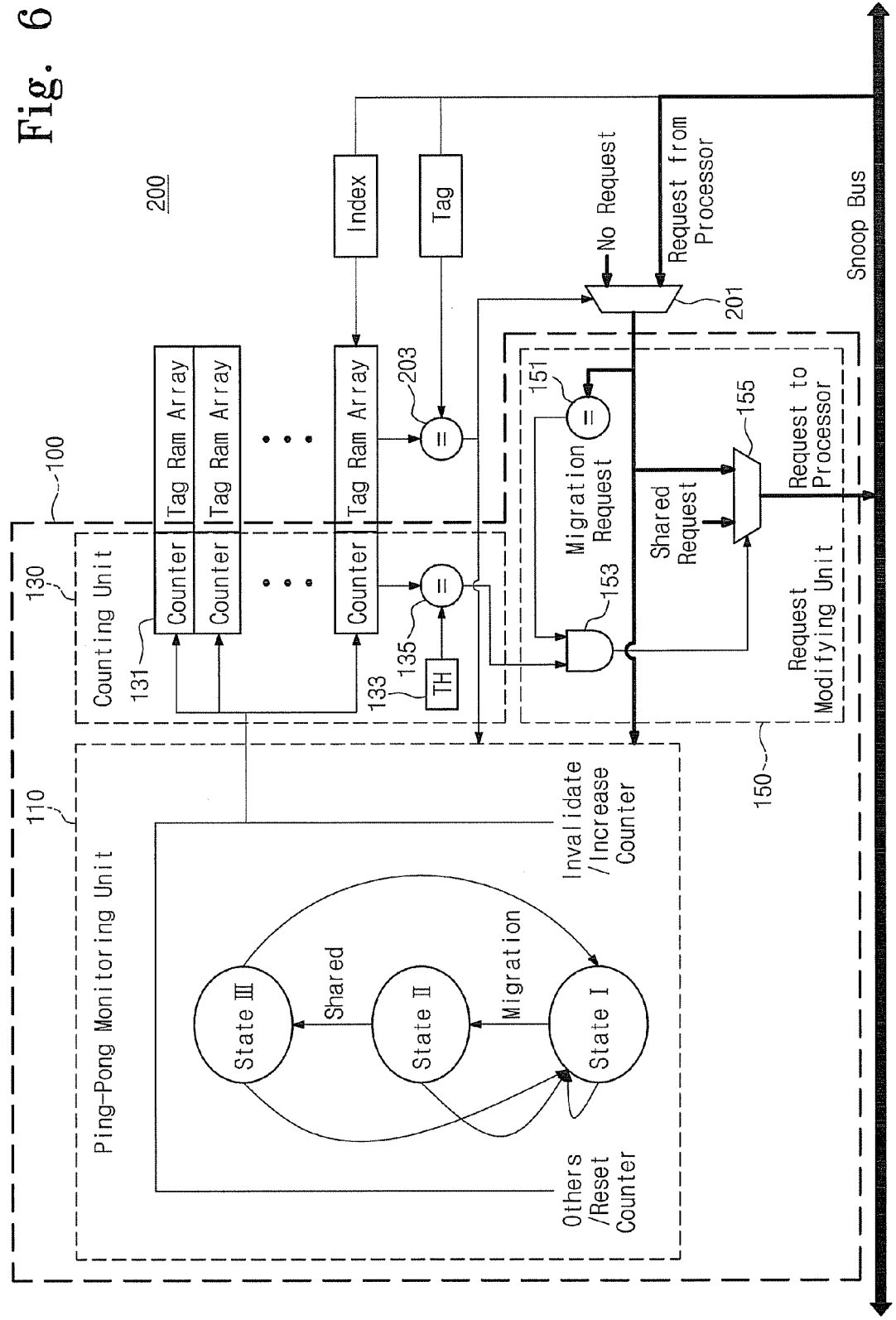
FIG. 6 is a drawing illustrating a detailed construction of FMSC illustrated in FIGS. 1 and 5 in accordance with example embodiments.

FIG. 6 is a drawing illustrating a detailed construction of FMSC 100 in accordance with example embodiments illustrated in FIGS. 1 and 5.

Referring to FIG. 6, a ping-pong monitoring unit 110 detects a ping-pong migration sequence in response to a request (for example, a migration request, a read shared request) asked from a plurality of processors (P0, P1). One ping-pong migration sequence may be constituted by three states. One ping-pong migration sequence is not recognized to be generated until a transition relative to three states managed by the ping-pong monitoring unit 110 is sequentially performed. The ping-pong monitoring unit 110 can provide a count-up control signal to the counting unit 130 whenever one ping-pong migration sequence is generated. Three states constituting a ping-pong migration sequence and an operation of the ping-pong monitoring unit 110 controlling the three states are as follows.

In an illustrative embodiment, a first state (state I) may mean an initial state of a ping-pong migration sequence. In the first state (state I), when a migration request is inputted through the request modifying unit 150, the ping-pong monitoring unit 110 may change a state of a ping-pong migration sequence from the first state (state I) into a second state (state II). In the meantime, in the first state (state I), a request different from a migration request is inputted through the request modifying unit 150, the ping-pong monitoring unit 110 can reset a count result of the counting unit 130. In this case, a state of a ping-pong migration sequence may be maintained to the first state (state I). At this time, the ping-pong monitoring unit 110 can control a counting operation of the counting unit 130 so that the number of ping-pong migration sequence successively generated is counted.

In the second state (state II), when a shared request is inputted through the request modifying unit 150, the ping-pong monitoring unit 110 can change a state of a ping-pong migration sequence from the second state (state II) into a third state (state III). In the second state (state II), when a request different from a migration request is inputted through the request modifying unit 150, the ping-pong monitoring unit 110 can reset a count result of the counting unit 130 and can change a state of a ping-pong migration sequence from the second state (state II) into the first state (state I).

In the third state (state III), if an invalidate request is inputted through the request modifying unit 150, the ping-pong monitoring unit 110 may generate a count-up control signal to count up a counting result of the counting unit 130 and may change a state of a ping-pong migration sequence from the third state (state III) to the first state (state I). In the third state (state III), if a request different from an invalidate request is inputted through the request modifying unit 150, the ping-pong monitoring unit 110 may reset a counting result of the counting unit 130 and may change a state of a ping-pong migration sequence from the third state (state III) to the first state (state I). As described above, a ping-pong migration sequence in accordance with example embodiments begins with the first state (state I) which is an initial state and returns to the first state (state I) after passing through the second state (state II) and the third state (state III). The three state transitions (from state I to state III) may constitute one ping-pong migration sequence.

The counting unit 130 may include a plurality of counters 131 and a first discrimination circuit 135. In an illustrative embodiment, each of the counters 131 can correspond to a tag RAM of a cache included in each of processors (Pi, the i is a positive integer). The counters 131 are constituted by a saturation counter to count the number of successive generations of a ping-pong migration sequence. The number of data which can be counted in the counter and bits of a counted result may be variously made up.

A desired (or alternatively, a predetermined) threshold value (TH) to be compared with a value counted in the counters 131 may be stored in a register 133. In an illustrative embodiment, the threshold value (TH) may be set by an application or an operating system (OS). The threshold value (TH) is a value which becomes a change reference of a coherence management mode (for example, a reference of whether a migration sharing method is applied or not) and the permissible number of successive generations of a ping-pong migration sequence may be stored in the threshold value (TH). The threshold value (TH) is not limited to a specific value but may be set or changed to various values according to an operation characteristic of a multi-processor system.

The first discrimination circuit 135 may be configured to discriminate whether a value counted in the counters 131 reaches a desired (or alternatively, a predetermined) value (i.e., a threshold value (TH)). In an illustrative embodiment, the first discrimination circuit 135 may compare the threshold value (TH) stored in the register 133 with a value counted in the counters 131 to provide the compared result to the request modifying unit 150. The first discrimination circuit 135 may provide a control signal having a first logic value to the request modifying unit 150 when a value counted in the counters 131 is equal to or greater than the threshold value (TH) stored in the register 133. The first discrimination circuit 135 may provide a control signal having a second logic value to the request modifying unit 150 when a value counted in the counters 131 is smaller than the threshold value (TH) stored in the register 133.

In the meantime, the FMSC 100 according to example embodiments may be included in the coherence management unit 200. Thus, according to example embodiments a request and data provided to the FMSC 100 may be provided through an internal circuit (for example, a request input unit 201, a tag discrimination unit 203) of the coherence management unit 200. Constructions of the request input unit 201 and the tag discrimination unit 203 are not limited to a specific form but may be variously changed. In an illustrative embodiment, the request input unit 201 and the tag discrimination unit 203 illustrated in FIG. 6 may be included in the coherence management unit 200 or in the FMSC 100.

The request input unit 201 receives a request provided by at least one among a plurality of processors and may provide the request to the ping-pong monitoring unit 110 and the request modifying unit 150. In an illustrative embodiment, the request input unit 201 may be constituted by a multiplexer. An output of the request input unit 201 may be controlled by a selection signal generated from the tag discrimination unit 203 included in the coherence management unit 200. The tag discrimination unit 203 may compare a tag value corresponding to a request inputted from at least one among a plurality of processors with a tag value stored in a tag RAM array corresponding to a cache of a processor. The tag discrimination unit 203 may activate a selection signal so that the request input unit 201 outputs a request inputted from a processor to the ping-pong monitoring unit 110 and the request modifying unit 150 when the tag value stored in a tag RAM array is identical to the tag value corresponding to an inputted request. A selection signal outputted from the tag discrimination unit 203 is also provided to the ping-pong monitoring unit 110 to announce that a request is inputted.

The request modifying unit 150 may include a second discrimination circuit 151, a logic circuit 153 and a request output unit 155. The second discrimination circuit 151 can discriminate whether a request provided from the request input unit 201 is a migration request or not. The logic circuit 153 can perform a logic operation (for example, a logic AND operation) on a discrimination result of the first discrimination circuit 135 and a discrimination result of the second discrimination circuit 151. A logic operation result performed in the logic circuit 153 may be provided to the request output unit 155 as a selection signal.

The request output unit 155 responds to a selection signal provided from the logic circuit 153 to output any one of a request inputted through the request input unit 201 and a shared request to a processor corresponding to the request. In an illustrative embodiment, the request output unit 155 may be constituted by a multiplexer. An output of the request output unit 155 may be controlled by a selection signal generated from the logic circuit 153. For example, in a case that a migration request is inputted in a state that a result counted in the counter 131 reaches a desired (or alternatively, a pre-determined) threshold value (TH), the request output unit 155 may output a shared request instead of a migration request inputted from a processor in response to a selection signal generated from the logic circuit 153. In a case except the above case, the request output unit 155 may output a request provided from the request input unit 201 to a corresponding processor in response to a selection signal generated from the logic circuit 153.

According to that composition, not only a cache coherence management mode may vary according to a monitoring result of a ping-pong phenomenon generated between multi-processors but also a request may vary to correspond to the varied coherence management mode. According to variance of a coherence management mode in accordance with example embodiments, since a migratory sharing method may be selectively applied, an unnecessary transaction is not generated between multi-processors. Thus, a waiting time of a processor and bus traffic are reduced. A reduction of bus traffic may improve bus utilization. Therefore, operation performance of a multi-processor may be effectively improved.

According to example embodiments, a threshold value (TH) used in variation of a coherence management mode may be modified at any time. Thus, although an application is changed, the threshold value (TH) can freely changed. The FMSC 100 according to example embodiments may be constituted by hardware. However, although the FMSC 100 is described above as being constituted by hardware, according to example embodiments, alternatively, all or a portion of the FMSC 100 may be constituted by firmware or middleware.

Figure 7:
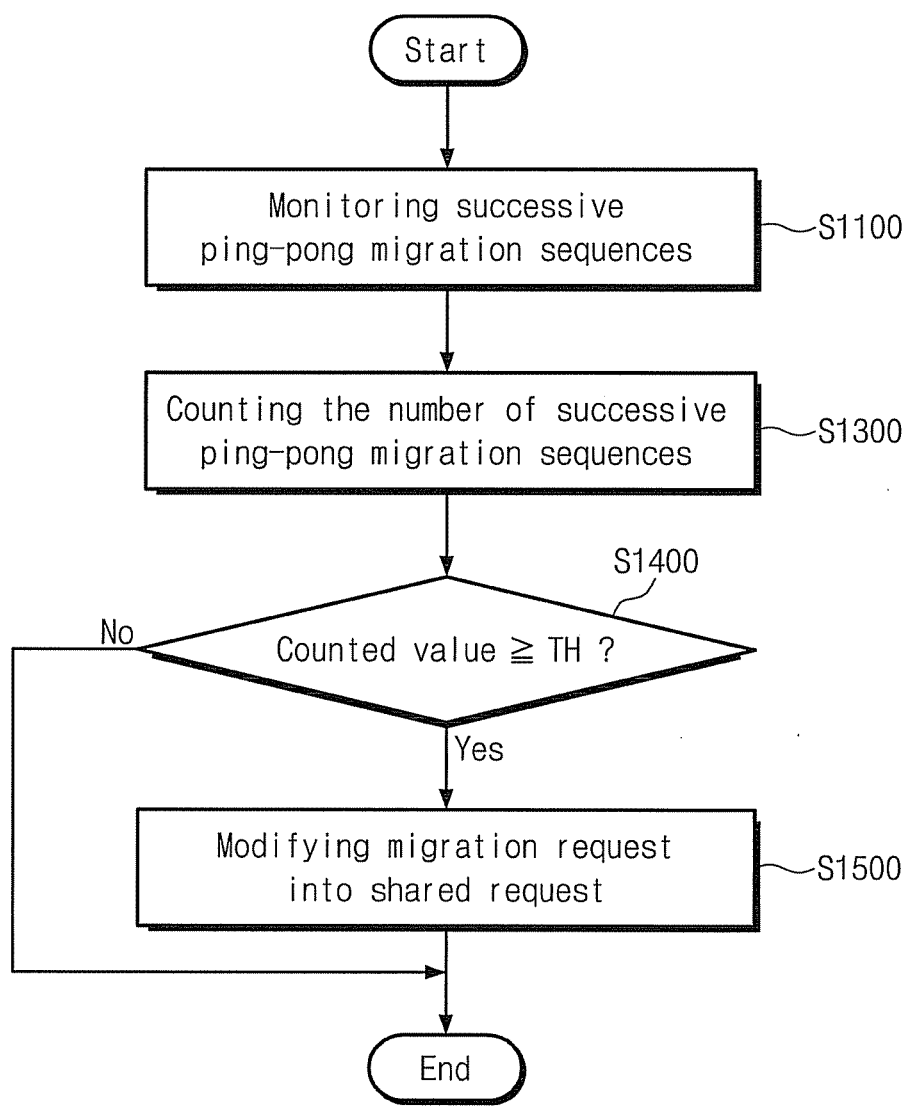
FIG. 7 is a flow chart illustrating a consistency management method in accordance with example embodiments.

FIG. 7 is a flow chart illustrating a consistency management method in accordance with example embodiments.

Referring to FIG. 7, in step S1100, a coherence management method according to example embodiments can monitor whether a successive ping-pong migration sequence generated from a plurality of cores, for example Core 0 and Core 1, included in a plurality of processors, for example P0 and P1, is generated or not through the ping-pong monitoring unit 110. A successive transaction generated between processors, that is, a ping-pong phenomenon can be monitored through a monitoring of a successive migration sequence. In an illustrative embodiment, a ping-pong migration sequence may be comprised of three states. According to example embodiments, it may be defined that a transition with respect to three states is performed one time as a ping-pong migration sequence is generated one time.

According to a monitoring result performed in S1100, a migratory sharing method may be selectively applied to a coherence management mode applied to a multi-processor. A change of a coherence management mode may be performed by a control of the ping-pong monitoring unit 110.

In step S1300, the number of generations of a successive ping-pong migration sequence may be counted through the counting unit 130. A counting operation of the counting unit 130 may be controlled by the ping-pong monitoring unit 110. In step S1400, it may be determined whether a result counted through the counting unit 130 it is equal to or greater than a desired (or alternatively, a predetermined) threshold value (TH). As a result of discrimination of step S1400, in a case that a result counted through the counting unit 130 is equal to or greater than a desired (or alternatively, a predetermined) threshold value (TH), the method may proceed to step S1500 and a migration request provided from a processor may be replaced or modified to a non-migratory request, for instance, a shared request by the request modifying unit 150. In this case, the request modifying unit 150 may provide a request replaced or modified in step S1500 to a corresponding processor instead of a migration request inputted from a processor. That a migration request is replaced or modified to a non-migratory request may mean that a migratory sharing method is not applied to a coherence management mode. As a result of the determination in step S1400, in a case that a result counted through the counting unit 130 is smaller than a desired (or alternatively, a predetermined) threshold value (TH), a request provided from a processor is not replaced or modified and a sequence is over. In this case, the request modifying unit 150 may not be replaced or modified but may provide a migration request inputted from a processor as it is to a corresponding processor. This may mean that a migratory sharing method is applied to a coherence management mode.

Figure 8:
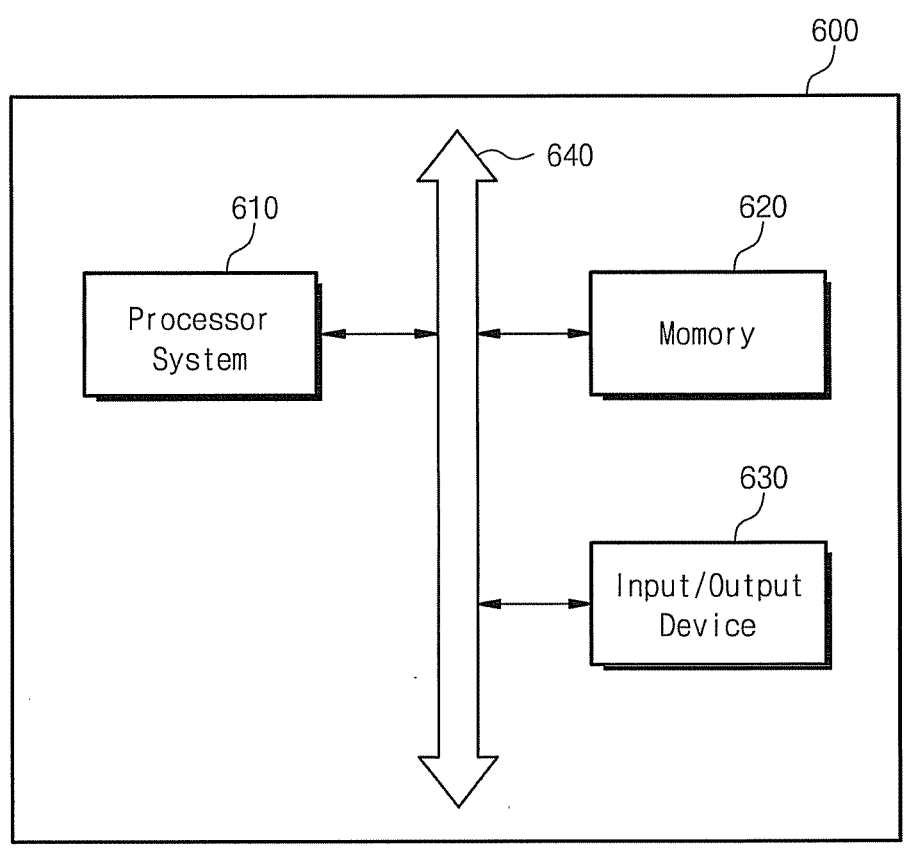
FIG. 8 is a block diagram roughly illustrating an electronic system according to example embodiments

FIG. 8 is a block diagram roughly illustrating an electronic system 600 according to example embodiments. Referring to FIG. 8, a processor system 610, an input/output device 630, and a memory 620 may perform data communication with each other by using a bus 640. The processor system 610 may execute a program and control the electronic system 600. The input/output device 630 may be used to input/output data to/from the electronic system 600. The electronic system 600 may be connected to an external device, e.g. a personal computer or a network, by using the input/output device 630 and may exchange data with the external device.

The processor system 610 may be a multi-processor system that has a plurality of processing cores each including one or more caches. The processor system 610 may be capable of selectively implementing migratory sharing between cores. For example, the processor system 610 may include one or more of the coherence management units described above in reference to FIGS. 1 through 6 for handling cache consistency management between the multiple processing cores of the processor system 610.

For example, such an electronic system 600 may embody various electronic control systems requiring the memory 620, and, for example, may be used in personal computers, network servers, video game consoles, mobile phones, MP3 players, navigation devices, solid state disks (SSD), or household appliances.

As described above, a coherence management method according to example embodiments can monitor a generation of a ping-pong migration sequence and can modify a coherence management mode on the basis of the monitoring result. As a result, an unnecessary transaction is not generated between multi-processors and a waiting time of a processor and bus traffic are reduced. A reduction of bus traffic can improve bus utilization. Thus, operation performance of a multi-processor can be effectively improved.

What is claimed is:

1. A cache consistency management device, comprising:
a ping-pong monitoring unit configured to monitor a ping-pong migration sequence generated between a plurality of processors;
a counting unit configured to count a number of successive generations of the ping-pong migration sequence in response to the monitoring result; and
a request modifying unit configured to modify a migration request to a request of a non-migratory sharing method on the basis of the counting result,
wherein the ping-pong migration sequence includes three sequential state transitions performed by requests provided from the plurality of processors, the three sequential state transitions including, in order, a transition from a first state to a second state, a transition from the second state to a third state, and a transition from the third state back to the first state, and
wherein the transition from the first state to the second state takes place upon detection of a migration request between the plurality of processing units, the transition from the second state to the third state takes place upon detection of a shared request between the plurality of processing units, and the transition from the third state back to the first state takes place upon detection of an invalidate request between the plurality of processing units.

2. The cache consistency management device of claim 1, wherein the request modifying unit is configured to modify a coherence management mode to be applied to the plurality of processors in response to the monitoring result.

3. The cache consistency management device of claim 2, wherein the coherence management mode is based on a MESI protocol comprising a modified state, an exclusive state, a shared state and an invalid state.

4. The cache consistency management device of claim 2, wherein a migratory sharing method is selectively applied to the coherence management mode.

5. The cache consistency management device of claim 1, wherein the request modifying unit is configured to modify the migration request to the request of a non-migratory sharing method in a case that the counting result is equal to or greater than a reference threshold value.

6. The cache consistency management device of claim 1, wherein the request of a non-migratory sharing method comprises a shared request.

7. The cache consistency management device of claim 1, wherein the counting unit comprises:
a plurality of counters corresponding to each tag RAM of the plurality of processors;
a register configured to store a reference threshold value; and
a first discrimination circuit configured to discriminate whether a result counted in the plurality of counters reaches the reference threshold value or not.

8. The cache consistency management device of claim 7, wherein the request modifying unit comprises:
a second discrimination circuit configured to discriminate whether a current request inputted at present from the plurality of processors is the migration request;
a logic circuit configured to generate a selection signal in response to a discrimination result of the first discrimination circuit and a discrimination result of the second discrimination circuit; and
a request output unit configured to output one of the current request and a request of the non-migratory sharing method.

9. The cache consistency management device of claim 8, wherein the request output unit is configured to output the request of a non-migratory sharing method in a case that the counting result reaches the reference threshold value and the current request is the migration request.

10. A multi-processor, comprising:
a plurality of processors each of which includes at least one cache; and
a cache consistency management device configured to count a number of successive generations of a ping-pong migration sequence generated between the plurality of processors, and configured to modify a coherence management mode with respect to the plurality of processors on the basis of the counting result,
wherein the ping-pong migration sequence includes three sequential state transitions performed by requests provided from the plurality of processors, the three sequential state transitions including, in order, a transition from a first state to a second state, a transition from the second state to a third state, and a transition from the third state back to the first state, and
wherein the transition from the first state to the second state takes place upon detection of a migration request between the plurality of processing units, the transition from the second state to the third state takes place upon detection of a shared request between the plurality of processing units, and the transition from the third state back to the first state takes place upon detection of an invalidate request between the plurality of processing units.

11. The multi-processor of claim 10, wherein the cache consistency management device is connected to the plurality of processors through a snoop bus.

12. The multi-processor of claim 10, wherein a migratory sharing method is selectively applied to the coherence management mode.

13. A cache consistency management method, comprising:
counting a number of successive generations of a ping-pong migration sequence generated between a plurality of processors;
modifying a migration request to a request of a non-migratory sharing method on the basis of the counting result; and
providing the modified request to a corresponding processor,
wherein the ping-pong migration sequence includes three sequential state transitions performed by requests provided from the plurality of processors, the three sequential state transitions including, in order, a transition from a first state to a second state, a transition from the second state to a third state, and a transition from the third state back to the first state, and
wherein the transition from the first state to the second state takes place upon detection of a migration request between the plurality of processing units, the transition from the second state to the third state takes place upon detection of a shared request between the plurality of processing units, and the transition from the third state back to the first state takes place upon detection of an invalidate request between the plurality of processing units.

14. The cache consistency management method of claim 13, wherein modifying the migration request includes modifying a coherence management mode to be applied to the plurality of processors on the basis of the counting result.

15. The cache consistency management method of claim 14, wherein a migratory sharing method is selectively applied to the coherence management mode.

16. The cache consistency management method of claim 13, wherein the migration request is modified to the request of the non-migratory sharing method in a case that the counting result is equal to or greater than a reference threshold value.

17. The cache consistency management method of claim 13, wherein the request of the non-migratory sharing method comprises a shared request.

18. A cache consistency management device, comprising:
a ping-pong monitoring unit configured to monitor a ping-pong migration sequence generated between a plurality of processors;
a counting unit configured to count a number of successive generations of the ping-pong migration sequence in response to the monitoring result; and
a request modifying unit configured to modify a coherence management mode to be applied to the plurality of processors on the basis of the counting result,
wherein the ping-pong migration sequence includes three sequential state transitions performed by requests provided from the plurality of processors, the three sequential state transitions including, in order, a transition from a first state to a second state, a transition from the second state to a third state, and a transition from the third state back to the first state, and
wherein the transition from the first state to the second state takes place upon detection of a migration request between the plurality of processing units, the transition from the second state to the third state takes place upon detection of a shared request between the plurality of processing units, and the transition from the third state back to the first state takes place upon detection of an invalidate request between the plurality of processing units.

19. The cache consistency management device of claim 18, wherein the request modifying unit modifies the coherence management mode by modifying a migration request to a request of a non-migratory sharing method based on the counting result.

20. A cache consistency management method, comprising:
counting a number of successive generations of a ping-pong migration sequence generated between a plurality of processors;
modifying a coherence management mode to be applied to the plurality of processors based on the counting result; and
providing the modified request to a corresponding processor,
wherein the ping-pong migration sequence includes three sequential state transitions performed by requests provided from the plurality of processors, the three sequential state transitions including, in order, a transition from a first state to a second state, a transition from the second state to a third state, and a transition from the third state back to the first state, and
wherein the transition from the first state to the second state takes place upon detection of a migration request between the plurality of processing units, the transition from the second state to the third state takes place upon detection of a shared request between the plurality of processing units, and the transition from the third state back to the first state takes place upon detection of an invalidate request between the plurality of processing units.

21. The cache consistency management method of claim 20, wherein the modifying a coherence management mode includes modifying a migration request to a request of a non-migratory sharing method based on the counting result and providing the modified request to a corresponding processor.

* * * * *